United States Patent Office 3,701,804
Patented Oct. 31, 1972

3,701,804
PROCESS FOR ADIPIC ACID MANUFACTURE
Walter H. Knoth, Jr., Mendenhall, Pa., and George W. Parshall, Wilmington, Del., assignors to E. I. du Pont de Nemours and Company, Wilmington, Del.
No Drawing. Filed Mar. 19, 1971, Ser. No. 126,345
Int. Cl. C07c 55/14
U.S. Cl. 260—530 R        5 Claims

ABSTRACT OF THE DISCLOSURE

Disclosed herein is a process for the manufacture of adipic acid, a reactant in the preparation of 6,6 nylon, comprising reacting cyclohexene and acetaldehyde in the presence of oxygen and a catalyst consisting of a salt of one of the metals vanadium, tungsten, molybdenum, osmium or ruthenium, said process optionally employing a cocatalyst consisting of an inorganic nitrogen-containing compound.

BACKGROUND OF THE INVENTION

(1) Field of the invention

This invention concerns a new process for the preparation of adipic acid in which acetic acid is a desirable secondary product.

(2) Description of the prior art

The nitric acid oxidation of cyclohexene to adipic acid with vanadium catalysis is known. See: U.S. Pat. 2,323,-861, British Pat. 1,068,905, French Pat. 981,609, and J. Franz and W. Knowles, Chem. and Ind., 1961, 250. These prior art processes, quite distinct from the novel process taught herein, suffer from the disadvantage of having reaction systems containing extremely corrosive nitric acid.

SUMMARY AND DETAILS OF THE INVENTION

Cyclohexene and acetaldehyde are reacted in the presence of oxygen and a primary catalytic compound of one of the metals vanadium, tungsten, molybdenum, osmium or ruthenium to form adipic acid and acetic acid.

Although it is desired not to be bound to any theory concerning the mechanism of reaction, it is believed that the following equations represent the major reaction paths:

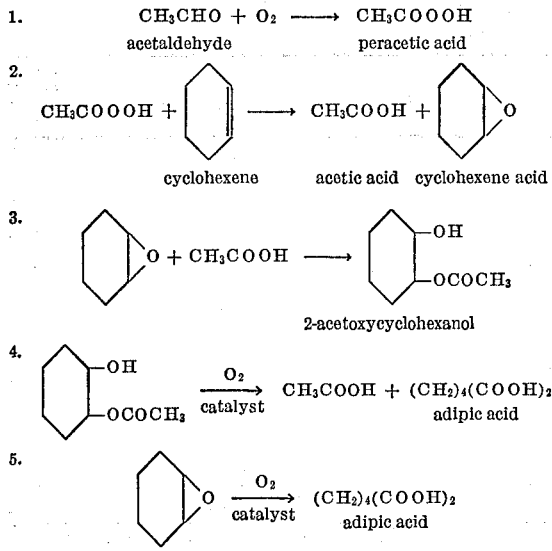

The proportions of cyclohexene and acetaldehyde which may be brought together in the process of this invention may be varied widely since at least some adipic acid and acetic acid will be formed even at 100:1 or 1:100 molar ratios, respectively. For practical yields, it is preferred to employ ratios between 3:1 and 1:15, and best yields are obtained when the respective molar ratios are between 1:1 and 1:5.

For the reaction to proceed economically, there should be present at least an equivalent amount and preferably a slight molecular excess of oxygen. Excess oxygen up to 100 fold may be employed but there is no advantage in extremely high oxygen proportions. Oxygen may be supplied to the reaction in the form of pure oxygen gas or in a gas mixture containing substantial quantities of oxygen along with inert materials as in air.

The metal catalyst is reduced in Equations 4 and 5 above but under the reaction conditions it is rapidly reoxidized. The catalyst may be any compound of the selected metals in which the metal is capable of facile valence change. The metal compound supplied to the reaction may contain the metal in any of its positive valence states. The amount of catalyst, expressed as metal, can range from 0.001 to 10% of the weight of the reaction mixture of cyclohexene and acetaldehyde. It is preferably in the range of 0.01 to 5% of this weight.

Some of the primary catalytic compounds contemplated to be employed alone or in combination are listed below.

Vanadium: ammonium meta-vanadate, vanadium acetylacetonanes, vanadyl acetylacetonate, vanadium, pentoxide, vanadic acid, the metal vanadates, vanadium oxy chloride, vanadyl naphthenate, vanadyl dichloride, vanadyl sulfate;

Tungsten: tungstic acid and its salts such as sodium and lithium tungstate, sodium phosphotungstate, sodium tungstosilicate, tungsten dioxide, tungsten trioxide, tungsten pentoxide, tungsten oxydichloride, tungsten oxytetrachloride;

Molybdenum: ammonium molybdate, sodium molybdate, molybdenum dioxide, molybdenum trioxide, molybdenum pentoxide, molybdenum sesquioxide, sodium phosphomolybdate, molybdenum oxydichloride, molybdenum oxytrichloride, molybdenum oxytetrachloride;

Osmium: osmium monoxide, osmium dioxide, osmium tetroxide, osmium sesquioxide, potassium osmiate;

Ruthenium: ruthenium dioxide, ruthenium tetroxide, and ruthenium nitrate.

Some of these catalytic compounds contain the metal in its catalytically active state. In others the metal is oxidized under the reaction conditions to a catalytically active form.

An inorganic nitrogen-containing cocatalyst can be employed to aid in the reoxidation of spent metal catalyst. Said cocatalyst can be one or more inorganic metal nitrate(s) and/or nitrogen oxide(s). The inorganic nitrate(s) may be any metal nitrate(s), however, alkali metal nitrates and alkaline earth metal nitrates are preferred. Particularly preferred are lithium, sodium and potassium alkali metal nitrates and magnesium and calcium alkaline earth metal nitrates. Operable nitrogen oxides include $N_2O$, $NO$, $N_2O_3$, $NO_2$, $N_2O_5$, and $NO_3$. The amount of cocatalyst(s) used may be up to 300% by weight of the metal in the primary catalyst.

The process of this invention may be carried out over a wide temperature range, particularly from $-20°$ to $200°$ C. Preferred temperatures are in the range from $15°$ to $125°$ C., temperatures of up to about $60°$ C. being preferred with, vanadium catalysts and temperatures over $60°$ C. being preferred with tungsten, molybdenum, osmium and ruthenium catalysts.

Pressure is not a critical variable in the process of this invention and pressures both above and below atmospheric may be employed. Preferred pressures are in the range from 1 to 60 atmospheres, and particularly preferred are pressures in the range from 1 to 15 atmospheres. When air is used as the oxidant, it is customary to employ pressures up to about 2 times those correspondingly employed with pure oxygen.

The reaction of this invention is usually essentially complete within a period of 1–20 hours. Longer periods are permissible and shorter periods (to a minimum of 15 minutes) may be used with some sacrifice in yield.

The addition of a liquid reaction medium in the process of this invention is not essential since the reaction can be carried out neat. If desired, a liquid which is relatively oxidation-resistant, such as acetic acid, ethyl acetate, benzene, tertiary butanol or water may be employed as a diluent.

PREFERRED EMBODIMENTS OF THE INVENTION

The following nonlimiting examples are meant to illustrate the invention. Percentages are by weight and stirring is maintained throughout the reaction period. All yield figures are based on cyclohexene charged. Examples 2, 20, 25, 27 and 31 have been included for comparative purposes.

EXAMPLE 1

Acetic acid (1 ml.), acetaldehyde (2 ml.), cyclohexene (1 ml.) and ammonium metavanadate, $NH_4VO_3$ (0.1 g.) were charged to a 375-ml. glass pressure bottle. This was chilled to about −78° C. and flushed with oxygen. It was then pressured to 50 p.s.i.g. with oxygen and heated to 60° C. at autogenous pressure. A leak developed after 15 minutes and little pressure could be maintained for the remainder of the reaction period (1.75 hours). Despite this, analysis of the product revealed a desirably high 4:1 ratio of adipic acid to glutaric acid (by-product).

EXAMPLES 2 TO 19

These examples are presented in Table 1. Example 2 therein shows the inferior results obtained in the absence of the metal catalyst taught herein.

Examples 2 to 19 were all conducted as follows: The reactants, including catalysts and any solvent used, were charged to a 375-ml. glass pressure bottle. This was chilled to about −78° C. and flushed with oxygen. The system was made pressure tight, the cooling bath was removed and oxygen was admitted to 44–46 p.s.i.g. while the bottle was still cool. The temperature was then brought to the desired level. In some instances the pressure vessel was repressured with oxygen to 45 p.s.i.g. when the pressure had fallen to about 30 p.s.i.g.; however, this did not seem to affect the results.

After the reaction period, excess pressure was vented slowly at ambient temperature, and a weighed amount of toluene or xylene was added to serve as a standard for quantitative gas chromatographic analysis. The crude mixture was then analyzed for the volatile constituents, including recovered acetaldehyde, cyclohexene, acetic acid and 2-acetoxycyclohexanol, by gas chromatography on a Varian Aerograph Series 1700 instrument. The gas chromatographic columns were stainless steel (6′ x ¼″) and were packed with 20% Triton® X305 (octylphenoxypolyethylene glycol) on 60–80 mesh Chromosorb® "W" Regular (diatomaceous earth which has been flux-calcined with sodium carbonate and then waterwashed). The columns were programmed from 80–200° C. at 6° C./minute with an injector temperature of 180° C.

For detection of the carboxylic acids formed in the experiment, the readily volatile materials were removed under reduced pressure from the remainder of the crude reaction product. A known amount of heptanoic, pimelic, or azelaic acid was added to the residue to serve as a standard for gas chromatographic analysis. The reaction mixture was then treated by one of two procedures (A or B, below), both designed to convert all of the carboxylic acids present to their methyl esters, which are sufficiently volatile to detect and measure by gas chromatographic analysis.

The following analytical procedures were employed in the manner described to determine the content of the reaction products made herein. Procedure A was employed to determine the products in Examples 1 and 3 and Procedure B was employed to determine the products in Examples 2 and 4 to 39.

Procedure A.—Ten milliliters of a 10% solution of boron trifluoride in methanol was added to the evaporation residue containing the reference acid. The mixture was heated on a steam bath for two minutes and then diluted with 30 ml. of water followed by three extractions with 30 ml. portions of hexane. The extracts were combined, concentrated to about 4 ml. and analyzed by gas chromatography using the equipment described above.

Procedure B.—This is preferred to Procedure A because it is more rapid and slightly more accurate. The evaporation residue containing the standard acid was diluted with 10 ml. of methanol. It was then basified with tetramethylammonium hydroxide and subjected to gas chromatographic analysis using the equipment described above, except that the injector temperature was about 300° C. The tetramethylammonium carboxylates pyrolyze to the methyl esters at this temperature.

TABLE 1

| Example | Cyclohexene | Acetaldehyde (ml.) | Solvent (ml.) | $NH_4VO_3$ (g.) | $LiNO_3$ (g.) | Temp. (°C.) | Reaction time (hrs.) | Percent yield of adipic acid |
|---|---|---|---|---|---|---|---|---|
| 2 | 2 ml. | 4 | | | | 21–24 | 20.0 | 0.3 |
| 3 | 1 ml. | 3 | 1 $CH_3COOH$ | 0.1 | 0.20 | 85 / 21–24 | 3.0 / 72.0 | 25.0 |
| 4 | 1 ml. | 3 | 1 $CH_3COOH$ | 0.1 | 0.05 | 85 | 3.5 | 12.5 |
| 5 | 1 ml. | 3 | 1 $CH_3COOH$ | 0.5 | | 80 | 5.5 | 13.3 |
| 6 | 1 ml. | 4 | | 0.1 | 0.10 | 85 | 4.0 | 17.5 |
| 7 | 1 ml. | 3 | 1 $CH_3COOH$ | 0.1 | 0.10 | 21–24 | 5.5 | 18.2 |
| 8 | 1 ml. | 4 | 2 $CH_3COOH$ | 0.1 | 0.10 | 21–24 | 94 | 21.6 |
| 9 | 1.40 g. | 4 | 1 $CH_3COOH$ / 0.5 $H_2O$ | 0.1 | 0.10 | 21–24 | 17 | 4.8 |
| 10 | 0.7 g. | 5 | 1 $CH_3COOH$ | 0.2 | 0.20 | 21–24 | 21 | 14.0 |
| 11 | 0.7 g. | 4 | 1 $CH_3COOH$ / 2 $(CH_3CO)_2O$ | 0.2 | 0.20 | 21–24 | 18 | 12.9 |
| 12 | 0.77 g. | 4 | 1 $CH_3COOH$ | 0.1 | | 21–24 | 17 | 20.4 |
| 13 a | 0.60 g. | 3 | 1 $CH_3COOH$ | 0.1 | | 40 | 6 | 5.6 |
| 14 | 0.72 g. | 3 | 1 $CH_3COOC_2H_5$ | 0.2 | | 21–24 | 17 | 20.2 |
| 15 | 0.82 g. | 4 | 1 $CH_3COOH$ | b 0.2 | | 21–24 | 16 | 22.6 |
| 16 | 0.72 g. | 4 | 1 $CH_3COOH$ | c 0.2 | | 21–24 | 16 | 17.9 |
| 17 | 0.76 g. | 3 | 1 $CH_3COOH$ / 1 $C_6H_6$ | 0.2 | | 21–24 | 16 | 14.8 |
| 18 | 0.85 g. | 4 | 1 $CH_3COOH$ | b 0.2 | | 21–24 | 18 | 10.1 |
| 19 | 0.96 g. | 1 | 1 $CH_3COOC_2H_5$ | d 0.3 | | 21–24 | 21 | 19.9 | a This example was conducted at 200 p.s.i.g. of oxygen in a glass lined stainless steel pressure vessel.
b The catalyst was vanadium (III) acetylacetonate.
c The catalyst was vanadium oxyacetylacetonate.
d The catalyst was vanadyl naphthenate.

EXAMPLES 20 TO 39

These examples are summarized in Table 2. The procedural details are generally the same as for Examples 1 to 19 except that Examples 20 to 39 were conducted in a 125 ml. glass pressure bottle, rather than a 375 ml. bottle. Reactants included 2 ml. of acetaldehyde and 0.5 ml. of acetic acid in addition to the reactants listed in the table.

High yields and the process of this invention

The particular disclosed catalysts are extremely important to produce high yields of adipic acid. The importance of these catalysts to the novel process is underscored in view of the absence of nitric acid that is employed in some prior art processes as the oxidant for cyclohexene.

When no catalysts are employed, yields are very low as can be seen from comparative Examples 2 (Table 1) and 20, 25, 27 and 31 (Table 2). In fact, yields are almost nil in Examples 2 and 20. To attempt substitution of other catalysts (undisclosed herein) in the process as taught would result in no adipic acid being formed, or, in the production of lower yields than are possible to achieve with the process of this invention.

The superiority of the novel process is borne out by the surprisingly high yields of adipic acid obtained herein. For instance, Example 36 shows a yield of 33%. Superiority of the novel process is also shown by the generally high yields obtained at relatively low temperatures.

TABLE 2

| Example number | Cyclohexene (g.) | Catalyst (0.1.g. of each) | Temp, °C | Time, hrs. | Percent yield, adipic acid |
|---|---|---|---|---|---|
| 20 | 0.30 | None | 21-24 | 18 | <1 |
| 21 | 0.31 | $NH_4VO_3$ | 21-24 | 2¼ | 12.7 |
| 22 | 0.32 | $NH_4VO_3$ | 21-24 | 18 | 22.8 |
| 23 | 0.30 | $HWO_4$ | 21-24 | 66 | 5.2 |
| 24 | 0.30 | $MoO_3$ | 21-24 | 18 | 7.5 |
| 25 | 0.31 | None | 40 | 17 | 7.2 |
| 26 | 0.30 | $NH_4VO_3$ | 40 | 18 | 16.8 |
| 27 | 0.31 | None | 60 | 18 | 7.2 |
| 28 | 0.30 | $NH_4V_3$ | 60 | 20 | 13.8 |
| 29 | 0.30 | $HWO_4$ | 60 | 17 | 10.0 |
| 30 | 0.30 | $RuO_2$ | 60 | 17½ | 22.0 |
| 31 | 0.31 | None | 80 | 2¼ | 1.1 |
| 32 | 0.31 | $NH_4VO_3$ | 80 | 2¼ | 12.7 |
| 33 | 0.30 | $HWO_4$ | 80 | 3 | 22.0 |
| 34 | 0.30 | $MoO_3$ | 80 | 3 | 29.4 |
| 35 | 0.30 | $RuO_2$ | 80 | 2 | 23.8 |
| 36 | 0.30 | $OsO_4/V_2O_5$ | 80 | 3¼ | 33.0 |
| 37 | 0.34 | $OsO_4$ | 80 | 3½ | 16.5 |
| 38 | 0.31 | $HWO_4$ | 100 | 2 | 18.1 |
| 39 | 0.31 | $MoO_3$ | 100 | 2 | 27.7 |

We claim:

1. A process for making adipic acid comprising reacting cyclohexene and acetaldehyde at molar ratios of 100:1 to 1:100, in the presence of at least one equivalent of oxygen and a catalytic compound of one of the metals vanadium, tungsten, molybdenum, osmium, ruthenium, or combinations thereof, in an amount, expressed as metal, of from 0.001% to 10% of the combined weight of cyclohexene and acetaldehyde, at a temperature between about −20° to 200° C., wherein the catalytic compound is selected from the group consisting of:

ammonium metal-vanadate, vanadium acetylacetonates, vanadyl acetylacetonate, vanadium pentoxide, vanadic acid, the metal vanadates, vanadium oxychloride, vanadyl naphthenate, vanadyl dichloride, vanadyl sulfate;

tungstic acid and its sodium and lithium tungstate salts, sodium phosphotungstate, sodium tungstosilicate, tungsten dioxide, tungsten trioxide, tungsten pentoxide, tungsten oxydichloride, tungsten oxytetrachloride;

ammonium molybdate, sodium molybdate, molybdenum dioxide, molybdenum trioxide, molybdenum pentoxide, molybdenum sesquioxide, sodium phosphomolybdate, molybdenum oxydichloride, molybdenum oxytrichloride, molybdenum oxytetrachloride;

osmium monoxide, osmium dioxide, osmium tetroxide, osmium sesquioxide, potassium osmiate;

ruthenium dioxidee, ruthenium tetroxide, and ruthenium nitrate.

2. A process according to claim 1, wherein the molar ratio of cyclohexene to acetaldehyde is between 3:1 to 1:15, respectively, and wherein there is a molecular excess of oxygen, an amount of catalytic compound of from 0.01% to 5% of the combined weight of cyclohexene and acetaldehyde, and the temperature is between about 15° to 125° C.

3. A process according to claim 2, wherein the molar ratio of cyclohexene to acetaldehyde is between 1:1 to 1:5.

4. A process according to claim 2, employing a cocatalyst selected from the group consisting of alkali metal nitrates, alkaline earth metal nitrates and nitrogen oxides, said cocatalyst present in an amount up to 300% of the weight of the metal of the catalytic compound.

5. A process according to claim 4, wherein the cocatalyst is at least one member selected from the group consisting of lithium, sodium, potassium, magnesium and calcium nitrates, and $N_2O$, $NO$, $N_2O_3$, $NO_2$, $N_2O_5$ and $NO_3$.

References Cited

UNITED STATES PATENTS 3,346,473  10/1967  Coffey et al. ____ 260—530 R X

FOREIGN PATENTS 1,076,455  7/1967  United Kingdom __ 260—533 C

OTHER REFERENCES

Triebs et al.: Chem. Ber., 86, pp. 616–25 (1953)—abstract only.

LORRAINE A. WEINBERGER, Primary Examiner

R. D. KELLY, Assistant Examiner

U.S. Cl. X.R.

260—533 C

PO-1050
(5/69)

UNITED STATES PATENT OFFICE
CERTIFICATE OF CORRECTION

Patent No. 3,701,804           Dated October 31, 1972

Inventor(s) Walter H. Knoth, Jr. and George W. Parshall

It is certified that error appears in the above-identified patent and that said Letters Patent are hereby corrected as shown below:

Col. 1, line 55, "cyclohexene acid" should be -- cyclohexene oxide --;

Col. 2, line 29, "ony chloro-" should be -- oxychloro- --;

Col. 3, Example 10, acetaldehyde amount should be "4" ml.

Col. 5, Example 28, catalyst should be -- $NH_4VO_3$ --;

Col. 6, line 3, correct the spelling of -- metavanadate --; and line 20, correct the spelling of -- dioxide--.

Signed and sealed this 8th day of May 1973.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,701,804    Dated October 31, 1972

Inventor(s) WALTER H. KNOTH, JR., ET. AL.

It is certified that error appears in the above-identified patent and that said Letters Patent are hereby corrected as shown below:

Column 2, line 28, after "vanadium", cancel the comma ","; and "tylacetonanes" should read -- tylacetonates --.

Signed and sealed this 20th day of November 1973.

(SEAL)
Attest:

EDWARD M. FLETCHER, JR.
Attesting Officer

RENE D. TEGTMEYER
Acting Commissioner of Patents